(12) United States Patent
    Horiike

(10) Patent No.: US 11,106,348 B2
(45) Date of Patent: Aug. 31, 2021

(54) USER INTERFACE APPARATUS, IMAGE FORMING APPARATUS, CONTENT OPERATION METHOD, AND CONTROL PROGRAM

(71) Applicant: CANON KABUSHIKI KAISHA, Tokyo (JP)

(72) Inventor: Yoshiteru Horiike, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 14/964,344

(22) Filed: Dec. 9, 2015

(65) Prior Publication Data
    US 2016/0170600 A1    Jun. 16, 2016

(30) Foreign Application Priority Data

Dec. 15, 2014   (JP) .............................. JP2014-252891
Oct. 23, 2015   (JP) .............................. JP2015-208609

(51) Int. Cl.
    *G06F 3/0486*   (2013.01)
    *G06F 3/0481*   (2013.01)
    (Continued)

(52) U.S. Cl.
    CPC .......... *G06F 3/0486* (2013.01); *G06F 3/0483* (2013.01); *G06F 3/0485* (2013.01); *G06F 3/0488* (2013.01); *G06F 3/04817* (2013.01)

(58) Field of Classification Search
    CPC ... G06F 3/0486; G06F 3/04817; G06F 3/0483
    See application file for complete search history.

(56) References Cited

U.S. PATENT DOCUMENTS 5,742,286 A * 4/1998 Kung .................... G06F 3/0486
                                                    715/733
2009/0058821 A1   3/2009 Chaudhri et al.
                   (Continued)

FOREIGN PATENT DOCUMENTS

CN    102789351 A    11/2012
CN    103873679 A     6/2014
                   (Continued)

OTHER PUBLICATIONS

King_Penguin, "How do I move iPad ap icons to a different screen?", published: Apr. 4, 2012, Apple Support Community, https://discussions.apple.com/message/18041821#18041821 (Year: 2012).*

(Continued)

*Primary Examiner* — Seth A Silverman
(74) *Attorney, Agent, or Firm* — Canon U.S.A., Inc. IP Division

(57) ABSTRACT

The present invention intends to improve the operability when a user performs a drag & drop operation to shift an icon from the present page to another page. A user interface apparatus detects whether an end portion of an icon has been brought into contact with a display frame of the page, irrespective of the position of a finger or a pen that operates the icon. If the contact state continues for a predetermined time, the user interface apparatus causes the page to transit. Therefore, smoothly and intuitively shifting the icon to the next page is feasible.

31 Claims, 11 Drawing Sheets

(51) Int. Cl.
*G06F 3/0483* (2013.01)
*G06F 3/0485* (2013.01)
*G06F 3/0488* (2013.01)

(56) References Cited

U.S. PATENT DOCUMENTS

| | | | |
|---|---|---|---|
| 2009/0178008 A1 | 7/2009 | Herz | |
| 2011/0252346 A1* | 10/2011 | Chaudhri | G06F 3/04886 715/765 |
| 2011/0271182 A1* | 11/2011 | Tsai | G06F 3/0483 715/702 |
| 2012/0324368 A1* | 12/2012 | Putz | G06F 3/0486 715/748 |
| 2013/0141378 A1* | 6/2013 | Yumiki | G06F 3/041 345/173 |
| 2014/0289662 A1 | 9/2014 | Morita | |
| 2014/0289669 A1* | 9/2014 | Wang | G06F 3/04817 715/781 |
| 2016/0004416 A1* | 1/2016 | Kim | G06F 3/04845 715/769 |

FOREIGN PATENT DOCUMENTS

| | | |
|---|---|---|
| JP | 2012-79315 A | 4/2012 |
| JP | 2014-505932 A | 3/2014 |
| KR | 10-2012-0075183 A | 7/2012 |
| KR | 10-2014-0024721 A | 3/2014 |
| KR | 10-2014-0105818 A | 9/2014 |

OTHER PUBLICATIONS

Parrish, "Windows Icon Size Guide (Win 7 ICO Format)", published: Nov. 1, 2011, creativefreedom.co.uk, https://www.creativefreedom.co.uk/icon-designers-blog/windows-7-icon-sizes/ (Year: 2011).*

* cited by examiner

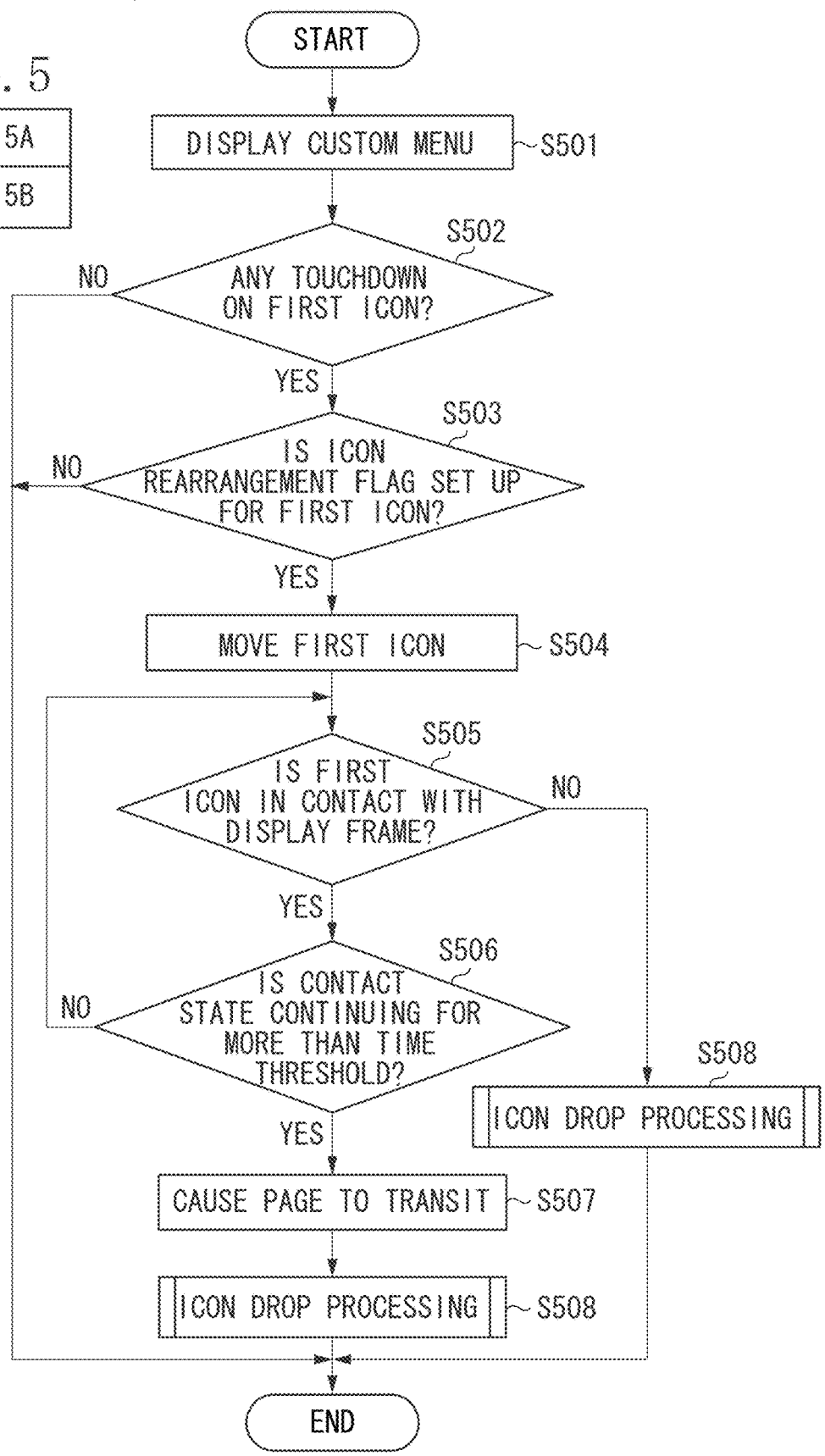

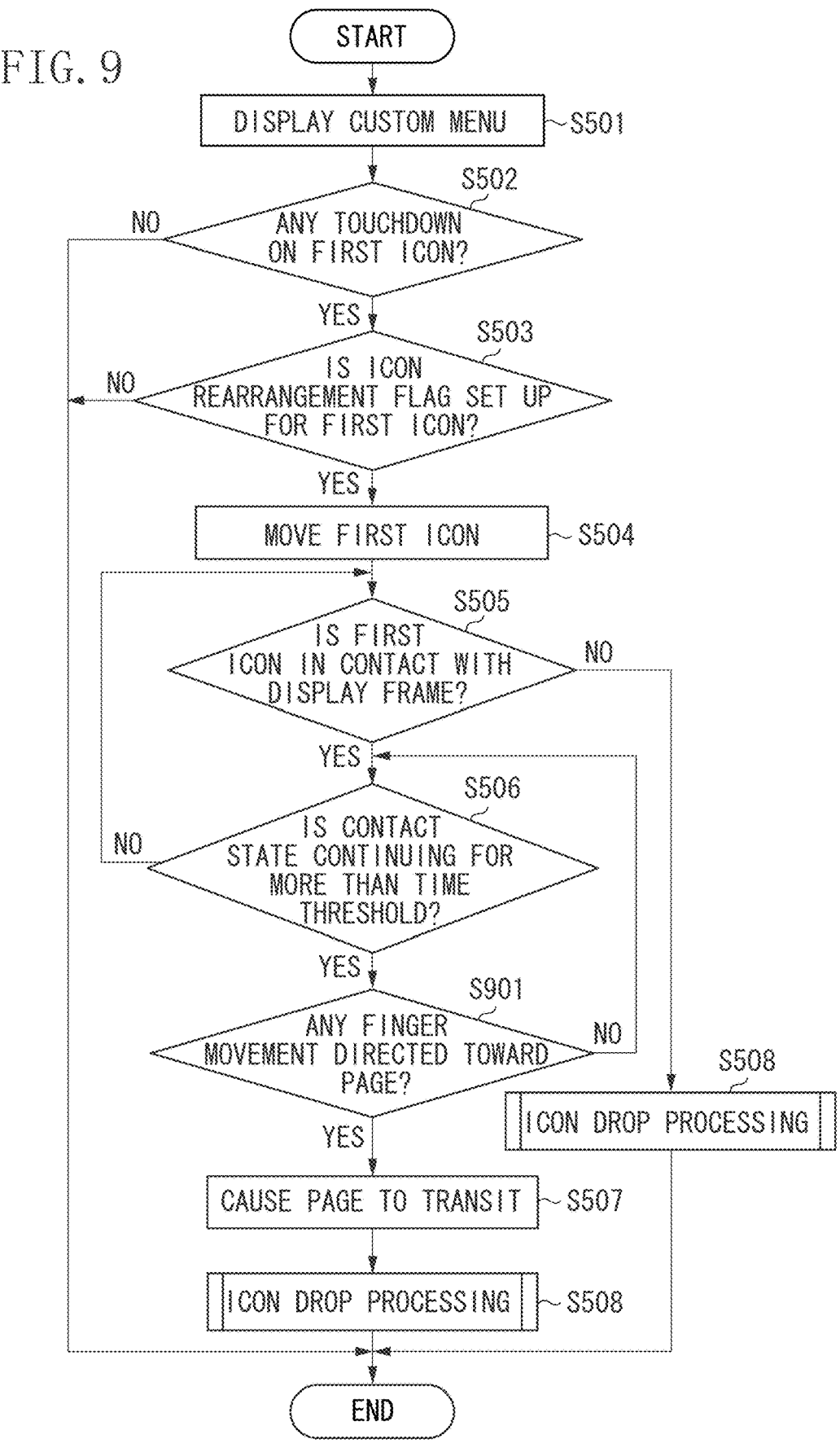

USER INTERFACE APPARATUS, IMAGE FORMING APPARATUS, CONTENT OPERATION METHOD, AND CONTROL PROGRAM

BACKGROUND OF THE INVENTION

Field of the Invention

The present invention relates to an image forming apparatus that enables a user to perform a drag operation to move an icon, to which an image formation related function is allocated, between pages.

Description of the Related Art

A computer that is equipped with a touch panel is conventionally known. Such a computer enables a user to perform a drag & drop operation with a user's finger to move a content displayed on a screen to an arbitrary page or to an arbitrary position. For example, the drag & drop operation can be performed by a user of a smartphone to move an application icon to an arbitrary page. More specifically, the drag operation by the user is performed in such a way as to select an application icon with a finger and move the selected icon to a left end or a right end of the screen. If the contact state of the finger with the left or right end region continues for a predetermined time, the smartphone permits the icon to transit to another page. Then, the icon can be located at an arbitrary position when the user releases the finger from the screen after moving the icon to an intended position of the switched page.

Further, an electronic book discussed in Japanese Patent Application laid-Open No. 2012-79315 enables a user to perform a touch operation to switch pages.

The drag & drop operation is intuitive and easy to understand when a user moves a specific icon from the present page to an arbitrary page in a state where numerous application icons are disposed, like the above-mentioned smartphone. However, if the system used for a conventional smartphone is directly applied to an apparatus that has a large-size screen, a long-distance dragging operation will be required to move an icon to the right or left end portion of the screen. Therefore, an operational burden of the user increases. Further, for example, if the operation timing is inadequate, the finger may not be detected at the right or left end portion of the screen. In this case, the system erroneously recognizes that the finger has been released from the icon before switching the pages. The icon returns to the original position of the previous page. This is the reason why the operation for switching the pages is complicated. The above-mentioned problem is not limited to the application icons. Similar problem will arise when a user performs a drag & drop operation to shift a content displayed on the screen to a different page.

In view of the above-mentioned problem, the present invention intends to provide a user interface apparatus that is excellent in user-friendliness in an operation for shifting an intended content between different pages.

SUMMARY OF THE INVENTION

A user interface apparatus according to the present invention includes a display unit configured to display a page that includes a region surrounded by a display frame in which a content is disposed, an input unit configured to accept a moving operation for moving a first content disposed on the page with an input instruction member, a display control unit configured to switch a page to be displayed to another page based on a position of the first content in a moving state according to the moving operation with the input instruction member, irrespective of a position of the input instruction member, and a locating unit configured to locate the first content to the another page according to the moving operation with the input instruction member accepted by the input unit, after the switching to the another page by the display control unit is completed.

Further features of the present invention will become apparent from the following description of exemplary embodiments with reference to the attached drawings.

BRIEF DESCRIPTION OF THE DRAWINGS

FIGS. 5A and 5B are flowcharts illustrating an operation procedure of the image forming apparatus.

FIG. 9 is a flowchart illustrating a processing procedure according to a fourth exemplary embodiment.

DESCRIPTION OF THE EMBODIMENTS

Figure 1:
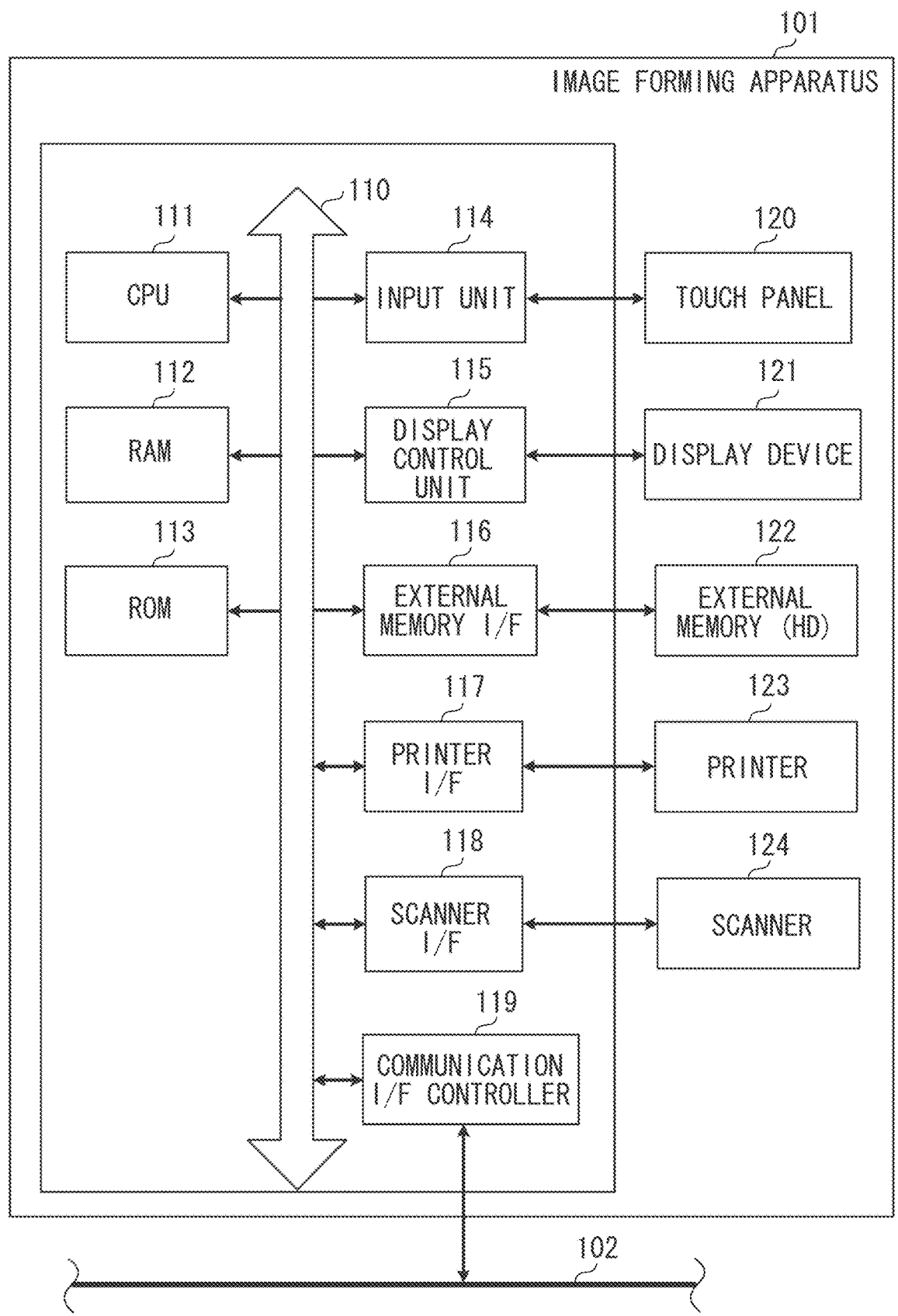
FIG. 1 illustrates a hardware configuration of an image forming apparatus according to a first exemplary embodiment of the present invention.

Hereinafter, exemplary embodiments of the present invention in which a user interface apparatus is applied to an image forming apparatus will be described. FIG. 1 illustrates a hardware configuration of an image forming apparatus 101 according to a first exemplary embodiment of the present invention.

The image forming apparatus 101 includes various functional components that are mutually connected via a system bus 110. The functional components include a computer, which is basically constituted by a central processing unit (CPU) 111, a random access memory (RAM) 112, and a read only memory (ROM) 113. The CPU 111 can execute a control program according to the exemplary embodiment of the present invention to control various operations to be performed by the image forming apparatus 101. More specifically, the control program causes the computer to operate as the image forming apparatus 101. The RAM 112 is a volatile rewritable storage medium, which is functionally operable as a work area of the CPU 111. The ROM 113 is a non-rewritable storage medium, which stores a boot program of the CPU 111.

An input unit 114, a display control unit 115, an external memory interface (I/F) 116, a printer I/F 117, a scanner I/F 118, and a communication I/F controller 119 are connected to the system bus 110. The functional components 111 to 119 connected to the system bus 110 can mutually transmit and receive data via the system bus 110.

The input unit 114 is functionally operable, in cooperation with the CPU 111, as an input unit configured to accept a drag and move operation, with an input instruction member, performed on a content disposed on a page displayed on a screen. The content is, for example, an image having a predetermined display size, such as an icon to which an image formation related function is allocated. The input instruction member is, for example, a hand or a finger of a user or an electronic pen. When a user operation with the input instruction member is accepted, the input unit 114 generates a control signal according to the accepted user operation and supplies the generated control signal to the CPU 111.

The input unit 114 includes a touch panel 120 as an input device that can accept a user operation. For example, the touch panel 120 includes a flat input surface and is configured to output coordinate information about a touched position on the flat input surface. The CPU 111 controls each functional unit of the image forming apparatus 101, based on the supplied control signal, which is generated by the input unit 114 according to the user operation on the input device, according to the control program. In this manner, the image forming apparatus 101 can operate according to the user operation.

The display control unit 115 includes a display device 121 and is functionally operable, in cooperation with the CPU 111, as a display unit configured to display a page on which a content is disposed on the screen surrounded by a display frame. More specifically, the display control unit 115 outputs a display signal to the display device 121 to display a page on which a plurality of contents is disposed. More specifically, when the CPU 111 has generated a display control signal according to the control program, the display control unit 115 receives the display control signal from the CPU 111. The display control unit 115 generates the display signal based on the received display control signal. The display device 121 can displays a graphical user interface (GUI) screen that configures a GUI based on the display control signal.

The touch panel 120 is integrated with the display device 121 and is functionally operable as a touch panel display device. For example, the touch panel 120 is configured in such a way as to prevent the display of the display device 121 from being disturbed due to inadequate light transmittance, and is attached to an upper layer of a display surface of the display device 121. Further, input coordinates of the touch panel 120 are associated with display coordinates of the display device 121. Therefore, the GUI can be configured to give a user a feeling of reality as if the user can directly operate the screen displayed on the display device 121.

The touch panel 120 can be selected from various types of touch panels, such as resistance film type, electrostatic capacitance type, surface acoustic wave type, infrared type, electromagnetic induction type, image recognition type, and optical sensor type.

An external memory 122 (e.g., a hard disk, a compact disk (CD), a digital versatile disk (DVD), or a memory card) is attachable to the external memory I/F 116. Under the control of the CPU 111, the external memory I/F 116 performs an operation for reading data from the attached external memory 122 and an operation for writing data into the external memory 122. The above-mentioned control program is stored in the external memory 122 and can be adequately loaded into the RAM 112 when the CPU 111 executes the program.

A printer 123 is connected to the printer I/F 117. The CPU 111 can control the printer I/F 117 to transfer image data to be printed by the printer 123 thereto. The printer 123 outputs a printed result on a recording medium based on the received image data.

A scanner 124 is connected to the scanner I/F 118. The CPU 111 can control the scanner 124 to read an image of a document and generate image data. The generated image data can be stored in the RAM 112, the ROM 113, or the external memory 122 via the scanner I/F 118. Further, the printer 123 performs printing based on the image data generated by the scanner 124. In this manner, a copy function can be realized.

The CPU 111 can control the communication I/F controller 119 to perform communications with an external device via an appropriate network 102, such as local area network (LAN), internet, or wired/wireless network. For example, the image data generated by the scanner 124 can be transmitted to an intended external device via the network 102. Further, the printer 123 can print image data received from an external device via the network 102.

The CPU 111 can detect the following operations performed on the touch panel 120 or operational states.

(i) "touchdown": a user operation to cause a finger or a pen (or any other substance) to touch the touch panel.

(ii) "move": a user operation to cause the finger or the pen to move while keeping the finger or the pen in contact with the touch panel.

(iii) "touch-on": a state where the finger or the pen is in contact with the touch panel.

(iv) "touch-up": a state where the finger or the pen is released from the touch panel.

(v) a user operation to move the finger or the pen to the outside of a software button region while keeping the finger or the pen in contact with the touch panel, after the touchdown is detected in the software button region displayed on the display device 121.

The touch panel 120 can detect multiple touch operations. More specifically, the touch panel 120 can detect the above-mentioned operations and states (i.e., touchdown, touch-on, move, and touch-up) that are simultaneously performed with a plurality of fingers or pens. The above-mentioned operations and position coordinates of the finger or the pen being in contact with the touch panel 120 can be notified to the CPU 111 via the system bus 110. The CPU 111 can identify the type of each operation performed on the touch panel based on the notified information. Regarding the operation "move", a moving direction of the finger or the pen moving on the touch panel 120 can be determined for each of vertical and horizontal components on the touch panel 120 based on a change of the position coordinates.

FIGS. 2A, 2B, and 2C and FIG. 3 illustrate an example of a change of the screen that can be displayed by the display device 121 of the image forming apparatus 101. The image forming apparatus 101 optically reads a paper document and converts a read image into electronic data. The image forming apparatus 101 has the copy function of performing image processing on the read electronic data and printing an image on another paper medium. Further, the image forming apparatus 101 has a send function of transmitting the read electronic data to another apparatus via the network 102. Further, the image forming apparatus 101 has a box function of saving the read electronic data in the external memory 122. Further, the image forming apparatus 101 has a web browser function of shaping and displaying HTML contents acquired from an external server via the network 102. The image forming apparatus 101 independently saves respective application programs, each being referred to as "AP" in the following description, which can realize the above-mentioned functions, as different APs, in the ROM 113. The CPU 111 executes a necessary AP according to a user's operational instruction and displays a screen on the display device 121.

Figure 2A:
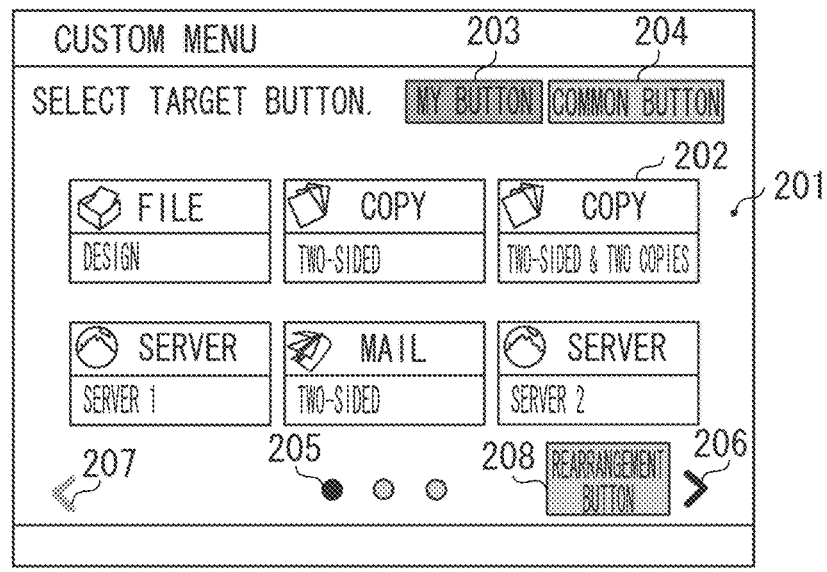
FIGS. 2A, 2B, and 2C illustrate a sequential transition of a display screen.

FIG. 2A illustrates a custom menu screen that can be displayed on the display device 121 under the control of the CPU 111. The custom menu saves AP setting values and displays button icons (hereinafter, referred to as "application buttons") respectively corresponding to AP functions, as examples of the contents, on the screen. When a user presses a desired application button, the custom menu is functionally operable as an AP calling unit configured to reproduce the saved setting value and call an AP corresponding to the pressed application button.

The custom menu illustrated in FIG. 2A includes a display region 201, as a screen surrounded by the display frame, in which a plurality of application buttons can be displayed. Each application button displayed in the display region 201 associates an AP that the image forming apparatus can execute with image formation setting values relating to the AP. If a user presses any one of the plurality of application buttons displayed in the display region 201, an AP screen associated with the pressed application button can be opened on the display device 121. Further, the setting values associated with the pressed application button can be reflected. The application buttons displayed in the display region 201 can be associated with user information authenticated through user authentication. A title and a comment can be set to each individual application button. Setting contents of each application button can be arbitrarily determined by a user who has registered the application button.

For example, a title "copy" and a comment "two-sided & two copies" are the setting contents for a copy button 202. The contents displayed for each application button includes an AP name and an icon associated with the application button in addition to the title and comment relating to the setting values. The copy button 202 is associated with a copy AP. According to the setting values associated with the copy button 202, the print type is two-sided print and the number of copies is two. If the copy button 202 is selected by the user, the display device 121 opens a screen illustrated in FIG. 3, which will be described in detail below.

The custom menu illustrated in FIG. 2A includes a "my button 203", as an application button that causes the display device 121 to display only the application buttons associated with the currently authenticated user in the display region 201. Further, the custom menu illustrated in FIG. 2A includes a common application button 204, as an icon (i.e., a button image) that causes the display device 121 to display only the application buttons that are associated with all users, namely application buttons that all users can use, in the display region 201. A page position indication mark 205 is displayed in the display region 201. The page position indication mark 205 is composed of a plurality of "○" marks each schematically representing a page. The page position indication mark 205, as a whole, indicates a virtually arrangement of a plurality of pages disposed in right and left direction. According to the example illustrated in FIG. 2A, the custom menu is composed of three pages. The currently displayed page is the first page that is virtually disposed at the leftmost end.

Page switching buttons 206 and 207 are also displayed in the display region 201. The page switching button 206 is an icon that enables a user to manually instruct a transition (i.e., a page switching) to a page virtually disposed on the right side of the currently displayed page. The page switching button 207 is an icon that enables the user to instruct a transition to a page virtually disposed on the left side of the currently displayed page. If there is not any page in a moving direction of the application button, the CPU 111 displays a notification message indicating the absence of pages on the screen and invalidates the movement of the application button. In this case, the display control unit 115 causes the display device 121 to perform a gray-out display of the corresponding page switching button. According to the example illustrated in FIG. 2A, no page is present on the left side of the currently displayed page. Therefore, the application button 207 is grayout displayed and the leftward movement is invalidated.

Figure 2B:
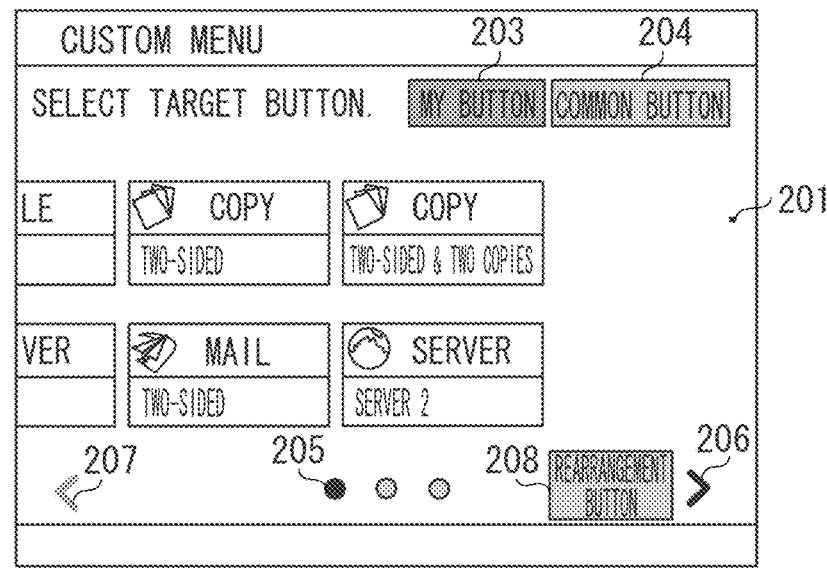
Figure 2C:
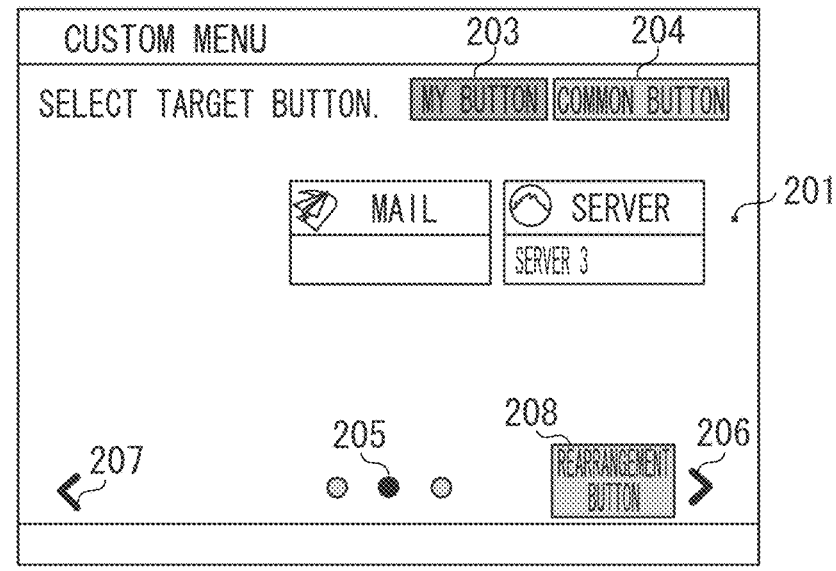

If the page switching button 206 is pressed on the screen illustrated in FIG. 2A, a list of application buttons in the display region 201 scrolls toward the left side of the screen (see FIG. 2B). Then, the screen transits into a state illustrated in FIG. 2C. According to the state illustrated in FIG. 2C, the page position indication mark 205 indicates the center of the three "○" marks. In other words, the page position indication mark 205 indicates that the second page is displayed. A rearrangement button 208 is an icon that validates the movement of the application button. If the setting state of the rearrangement button 208 is ON, a user can perform the drag & drop operation to move the application button from the present page to another page. More specifically, the user can shift a desired application button from the present page to an arbitrary place of another page. In the present exemplary embodiment, the place where the application button can be located is an arbitrary place of any one of the first to third pages. If the setting state of the rearrangement button 208 is OFF, the drag & drop operation cannot be performed.

Although the drag & drop operation using the rearrangement application button 208 has been described in the present exemplary embodiment, there will be a modified example. For example, if the operational mode becomes a drag operable mode when a user presses and hold an application button for a long time, the user can move and locate the application button to an arbitrary place. Therefore, the present invention is applicable to such a modified exemplary embodiment.

Figure 3:
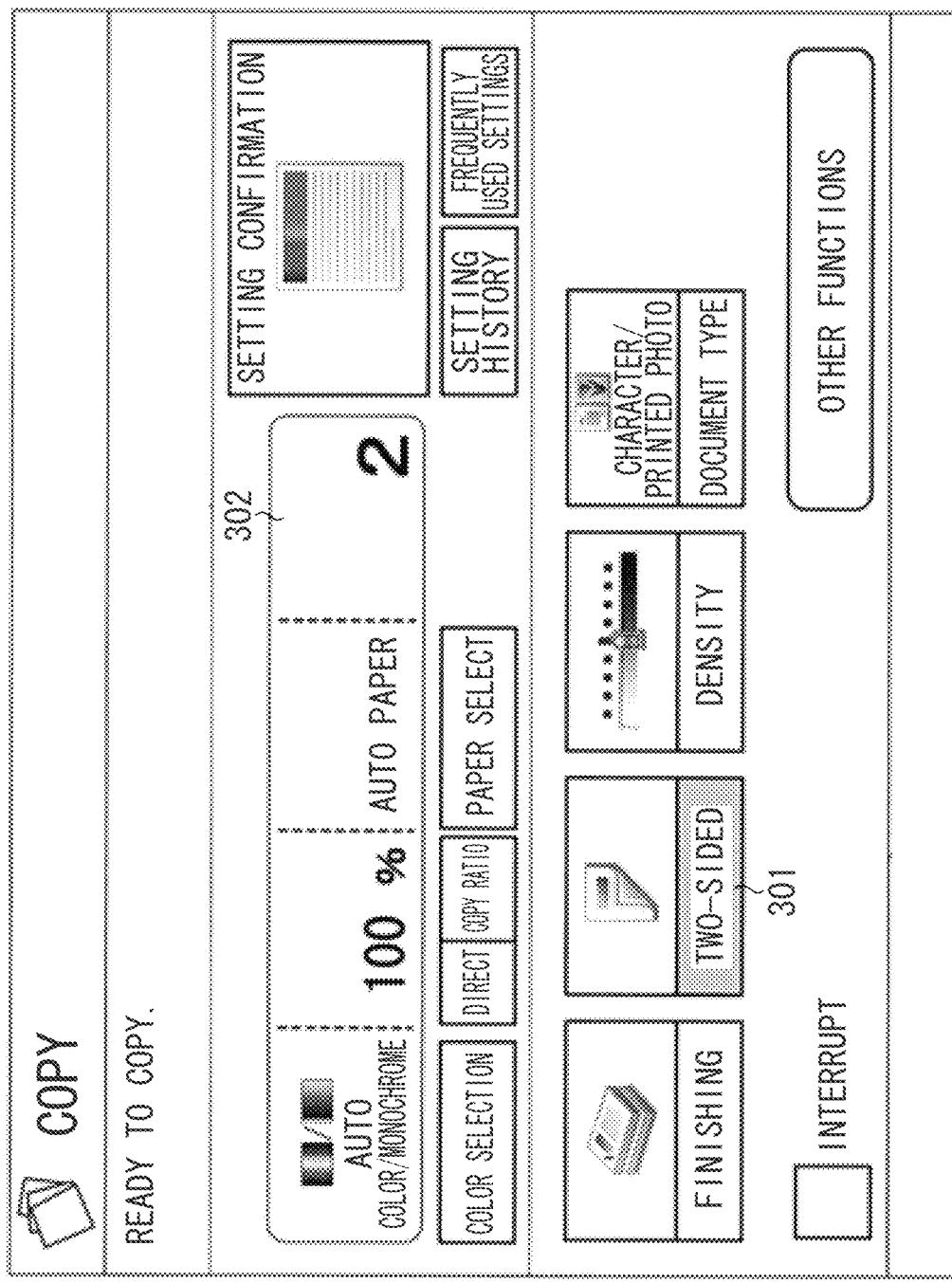
FIG. 3 illustrates an example of the display screen.

FIG. 3 illustrates an example of the setting screen of the copy AP that can be displayed when the copy button 202 is selected on the menu screen illustrated in FIG. 2A. The setting screen illustrated in FIG. 3 includes a two-sided button 301 that indicates that the two-sided print is set. Further, in a number-of-printed-copies area 302, it is indicated that a setting value "2" is set as the number of copies to print.

Next, an example of the drag & drop operation will be described in detail below with reference to FIGS. 4A to 4F. A display screen illustrated in FIG. 4A includes a drag 401 for causing the copy button 202 to move across a display frame 402. In the present exemplary embodiment, the image forming apparatus 101 switches pages to be displayed on the screen while maintaining the display state of the dragged copy button 202.

Figure 4A:
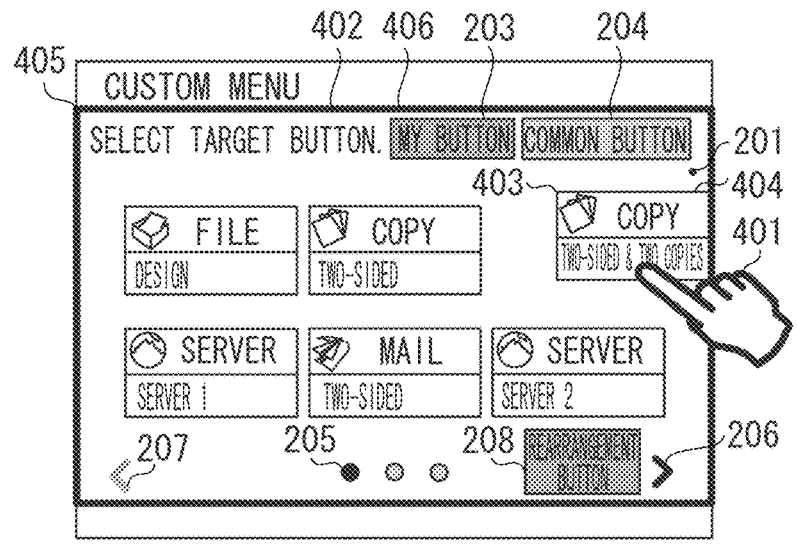
FIGS. 4A, 4B, 4C, 4D, 4E, and 4F illustrate a sequential transition of the display screen.

According to the example illustrated in FIG. 4A, the copy button 202 being moved by the drag 401 is in contact with the display frame 402. A procedure of processing that can be performed by the image forming apparatus 101 in this case will be described in detail below. The copy button 202 can be shifted and dropped into the next page in a state where the copy button 202 being currently operated by the drag 401 is in contact with the display frame 402. It is assumed that the next page appears from the right side of the screen. Further, it is assumed that (x1, y1) represents coordinates of an upper-left corner 403 of the copy button 202 to be moved by the drag 401 and w1 represents a width 404 of the copy button 202. Further, (x2, y2) represents coordinates of an upper-left corner 405 of the display frame 402 and w2 represents a width 406 of the display frame 402.

In this case, if a sum value (x1+w1) exceeds a sum value (w2+x2), the image forming apparatus 101 determines that the copy button 202 is in contact with the display frame 402. On the other hand, it is now assumed that the user moves the copy button 202 toward a left page. In this case, if the value x1 is smaller than the value x2, the image forming apparatus 101 determines that the copy button 202 is in contact with the display frame 402.

Figure 4B:
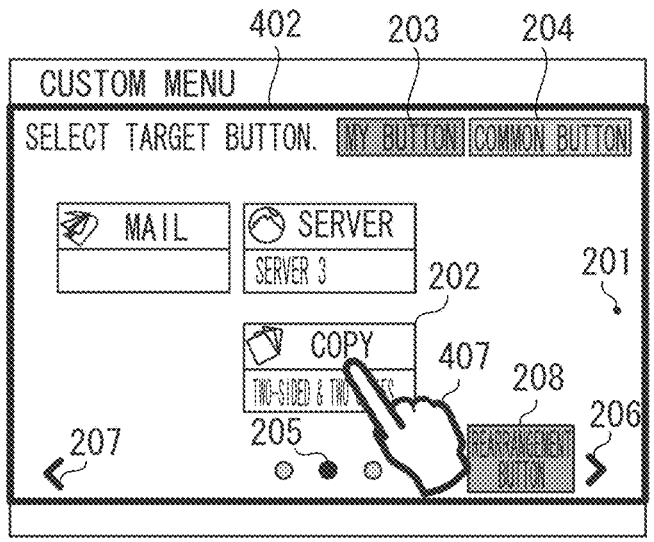

FIG. 4B illustrates a state where the copy button 202 has been shifted to the second page by the drag 401 from the contact state illustrated in FIG. 4A and has been moved to a blank position by the operation of a drop 407. The order according to which the copy button 202 is moved by the operation of the drop 407 is associated with the locating order of the application button in the generation of the custom menu screen.

Figure 4C:
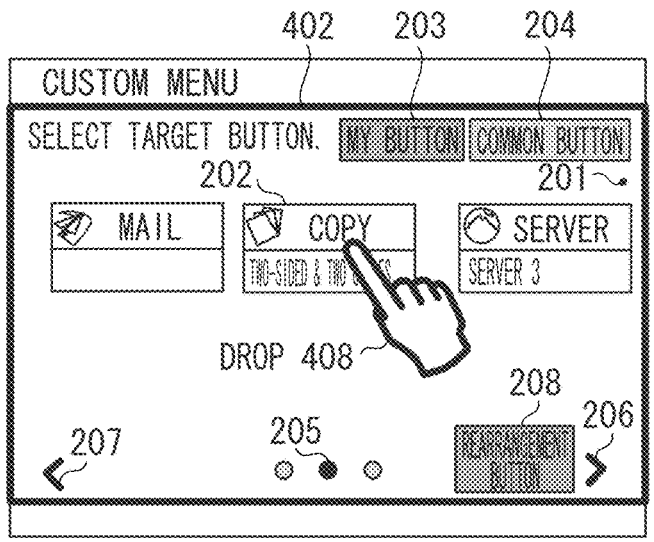
Figure 4D:
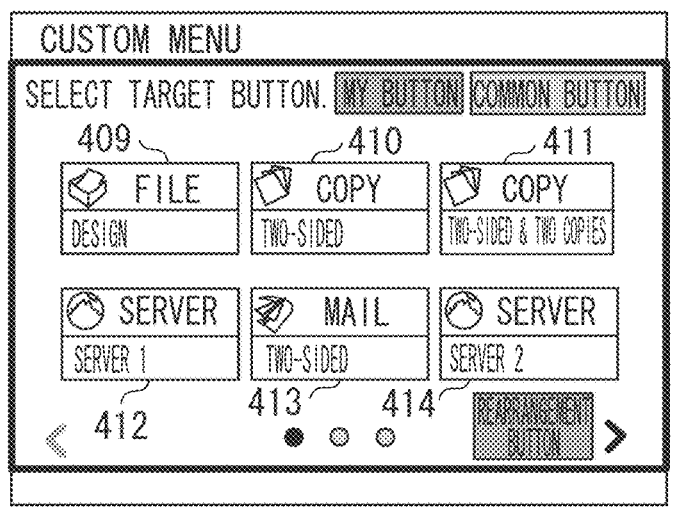
Figure 4E:
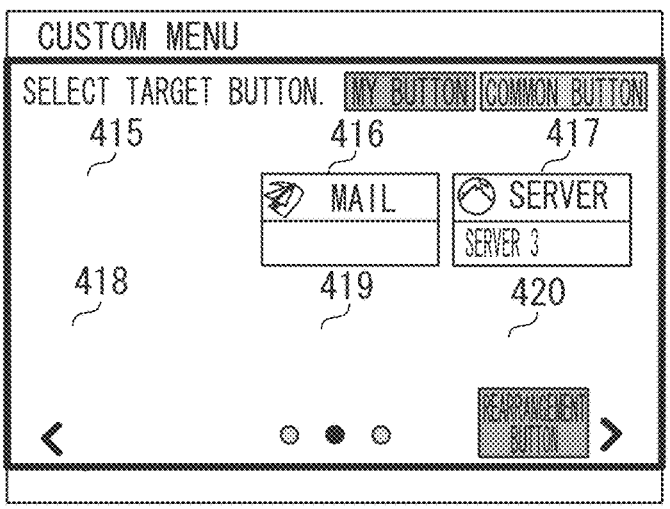

For example, according to examples illustrated in FIGS. 4D and 4E, the order of disposing the application buttons accords with the selection order by the user at the generation timing of the custom menu screen. As illustrated in the drawings, respective application buttons are disposed at positions 409 to 420. The display sizes settable for respective application buttons are S size, M size, and L size. In the present exemplary embodiment, it is assumed that six application buttons can be disposed on one screen if the selected side is the M size. There is not any application button disposed at blank positions 415 and 418 to 420. If the locating position of the copy button 202 changes, the locating position of another application button changes correspondingly. When the relocation completes, the custom menu newly updates the locating information.

According to the state illustrated in FIG. 4B, the locating position of the copy button 202 changes from the initial position 411 to the blank position 419. Therefore, the locating positions of respective application buttons (including blanks) change from the positions 412 to 419 to the positions 411 to 418, correspondingly.

FIG. 4C illustrates a state where an operation of drop 408 has been performed at the locating position 416 of a mail button after the copy button 202 has moved into the second page from the contact state illustrated in FIG. 4A. In this case, since the copy button 202 has been moved from the initial locating position 411 to the position 416, the locating positions of respective application buttons (including the blanks) change from the positions 412 to 416 to the positions 411 to 415, correspondingly. According to the above-mentioned example, the movement of an application button causes other application buttons to change their locations in such a way as to complement the pre-movement position. However, another method is employable.

For example, when an application button is moved, it is useful to replace the locating position of another application button disposed at a moving destination by the locating position of the moved application button. More specifically, when a user drags the copy button 202 from the position 411 and drops the copy button 202 at the position 416, the mail button is relocated from the initial position 416 to the position 411. In this case, the locating positions of another buttons are not changed.

Further, in a case where there is another application button disposed at the moving destination, it is useful to relocate another application buttons in such a way as to complement the pre-movement positions. In a case where the moving destination is a blank position, it is useful that another application buttons are not relocated. More specifically, when a user drags the copy button 202 from the locating position 411 and drops the copy button 202 at the position 416, respective application buttons are relocated from the positions 412 to 416 to the positions 411 to 415. On the other hand, when a user drops the copy button 202 at the blank position 415, the copy button 202 is disposed at the position 415 and another application buttons are not relocated. Therefore, the position 411 becomes a blank position.

Figure 4F:
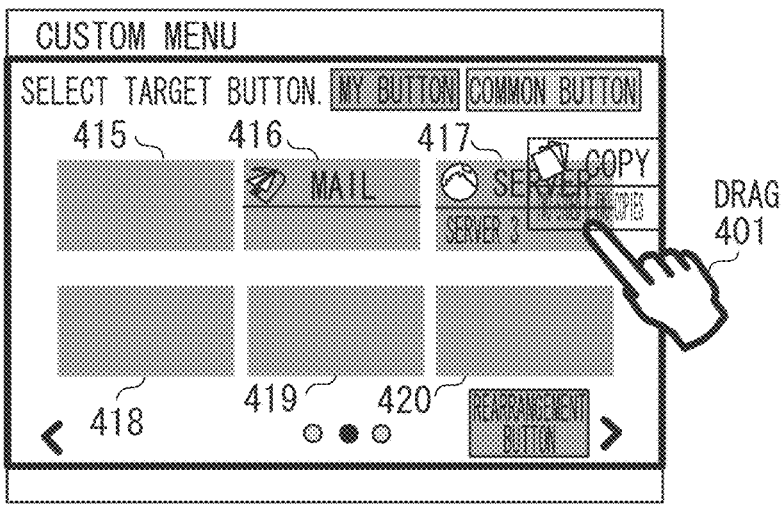

Further, to enable a user to easily recognize a dropable position when the user drags an application button, it is useful to add a color to the dropable position. FIG. 4F illustrates an example of the colored dropable position. As mentioned above, when dropable positions including the blank positions 415 and 418 to 420 are colored beforehand, the user can easily recognize the position to which the dragging application button can be located.

Figure 5B:
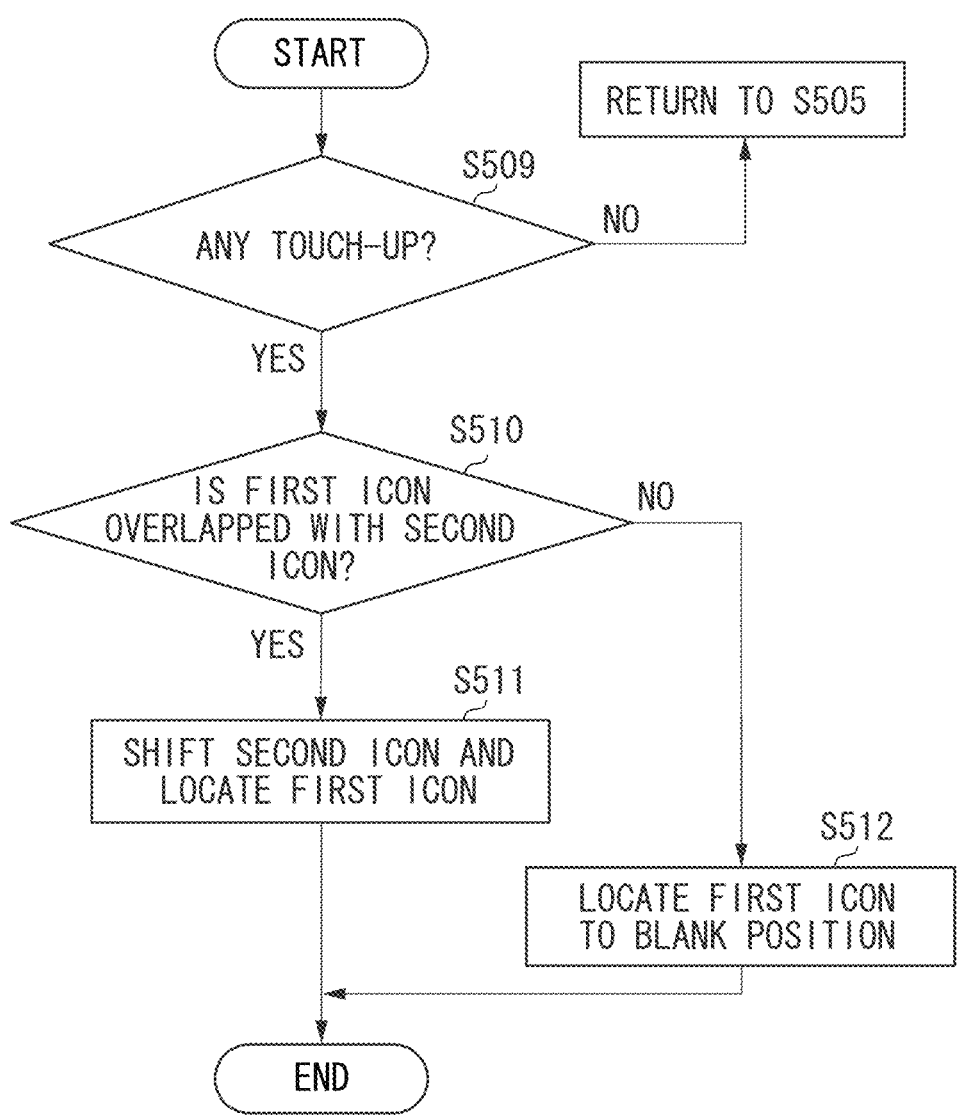

Next, an example of a content operation method that can be performed by the image forming apparatus 101 will be described in detail below with reference to FIGS. 5A and 5B. In this case, the content to be operated is each icon. FIGS. 5A and 5B are flowcharts illustrating a procedure of processing that can be performed by the image forming apparatus 101 when the custom menu screen illustrated in FIG. 2 is displayed on the display device 121. To realize each processing step of the flowcharts illustrated in FIGS. 5A and 5B, the CPU 111 executes a program loaded from the ROM 113 or the external memory 122.

Referring to FIG. 5A, in step S501, the CPU 111 and the display control unit 115 cooperatively cause the display device 121 to display a list of icons included in the custom menu screen in response to a predetermined operation of a user. In step S502, the CPU 111 determines whether the touchdown operation has been detected on a specific icon (e.g., first content or a first icon). If the CPU 111 determines that the touchdown operation has been detected on the first icon (YES in step S502), then in step S503, the CPU 111 determines whether an icon rearrangement flag is valid. More specifically, the CPU 111 determines whether the icon rearrangement flag has been set up. If the rearrangement flag has been set up, the mode for causing the first icon to move according to the drag 401 illustrated in FIG. 4A can be activated. The icon rearrangement flag is set up by the CPU 111 when the setting state of the rearrangement application button 208 is ON. On the other hand, the CPU 111 cancels the icon rearrangement flag when the setting state of the rearrangement application button 208 is OFF. The CPU 111 can be configured in such a way as to set up the icon rearrangement flag when the touchdown operation detected on the first icon continues for a predetermined time.

In step S503, if the CPU 111 determines that the icon rearrangement flag is set up for the first icon (YES in step S503), then in step S504, the CPU 111 causes the dragged first icon to move according to the user operation.

If the touchdown has not been detected on the first icon (NO in step S502), and if the icon rearrangement flag has not been set up (NO in step S503), the CPU 111 terminates the processing of the flowchart illustrated in FIG. 5A.

Subsequently, in step S505, the CPU 111 determines whether the first icon is in contact with the display frame. More specifically, the CPU 111 determines that the first icon is in contact with the display frame if the above-mentioned condition "x1+w1≥w2+x2 or x1≤x2" can be satisfied, where x1 represent the x coordinate of the left end of the first icon, w1 represents the width of the first icon, x2 represents the x coordinate of the left end of the display frame, and w2 represents the width of the display frame. If the CPU 111 determines that the first icon is in contact with the display frame (YES in step S505), then in step S506, the CPU 111 determines whether the contact state continues for a predetermined time with reference to a threshold (i.e., a time threshold). The time threshold is, for example, 0.1 to several seconds. If the CPU 111 determines that the contact time is less than the threshold (NO in step S506), the operation returns to step S505. If the CPU 111 determines that the contact time is equal to or greater than threshold (YES in step S506), then in step S507, the CPU 111 causes the page to transit. Subsequently, in step S508, the CPU 111 performs icon drop processing and then terminates the processing of the flowchart illustrated in FIG. 5A.

In step S505, if the CPU 111 determines that the first icon is not in contact with the display frame (NO in step S505), then in step S508, the CPU 111 immediately perform the icon drop processing and then terminates the processing of the flowchart illustrated in FIG. 5A.

FIG. 5B illustrates a detailed procedure of the icon drop processing to be performed in step S508 illustrated in FIG. 5A. Referring to FIG. 5B, in step S509, the CPU 111 determines whether there is a touch-up operation performed by the dragging finger. If the CPU 111 determines that there is not any touch-up operation performed by the dragging finger (NO in step S509), the operation returns to S505. If the CPU 111 determines that there is the touch-up operation performed by the dragging finger (YES in step S509), then in step S510, the CPU 111 determines whether the first icon is overlapped with another icon already displayed (e.g., a second content or a second icon). If the CPU 111 determines that the first icon is overlapped with the another icon already displayed (YES in step S510), the CPU 111 further determines whether to shift the second content to another position or locate the first content to a blank position with reference to the overlapping degree of the icons. In the present exemplary embodiment, in step S511, the CPU 111 shifts the second icon and locates the first icon. Then, the CPU 111 terminates the processing of the flowchart illustrated in FIG. 5B. In determining whether the first icon is overlapped with the second icon, the CPU 111 checks the degree of overlapping between an area of the first icon and an area of the second icon. If the overlapping degree is equal to or greater than a predetermined threshold, the CPU 111 determines that the first icon is overlapped with the second icon. In the present exemplary embodiment and the following description, a practical value of the above-mentioned threshold is 60%.

In step S510, if the CPU 111 determines that the first icon is not overlapped with the second icon (NO in step S510), then in step S512, the CPU 111 locates the first icon to a blank position. Then, the CPU 111 terminates the processing of the flowchart illustrated in FIG. 5B.

As mentioned above, when a user shifts an icon to the next page, the image forming apparatus 101 according to the first exemplary embodiment determines whether an end portion of the icon is in contact with the display frame, irrespective of the position of the user's finger. Therefore, compared to the conventional image forming apparatus, it is unnecessary to provide a UI operation region in the icon moving direction. Further, it is feasible to prevent erroneous recognition that the user's finger has been released from the icon even when the user is dragging the finger. Therefore, the present exemplary embodiment can provide an intuitive operational environment and can provide the apparatus that is excellent in user-friendliness.

The first exemplary embodiment has been described with reference to the drag & drop operation performed on the list of icons included in the custom menu screen. However, the moving target of the present invention is not limited to the above-mentioned listed icons. The present invention is also applicable to an operation for moving various contents that can be displayed on a screen.

Next, a second exemplary embodiment will be described in detail below. The image processing apparatus 101 according to the second exemplary embodiment has a configuration similar to that described in the first exemplary embodiment. Hereinafter, constituent elements similar to those described in the first exemplary embodiment are denoted by the same reference numerals. In the first exemplary embodiment, when a user moves an icon to the next page, the image processing apparatus determines whether the icon is in contact with the display frame, as a simple example.

In the second exemplary embodiment, the image processing apparatus 101 detects the display size of the first icon (or acquires the display size of the first icon beforehand) and changes the threshold to be used in determining whether the first icon is in contact with the display frame according to the display size of the first icon. The threshold used in the present exemplary embodiment is not the time threshold. The threshold according to the present exemplary embodiment is a size threshold to be referred to in determining whether to cause the page to transit, which can be obtained by taking an overhang of the first icon from the display frame into consideration. A method for setting and changing the threshold includes preparing a map of thresholds in relation to predetermined display sizes (e.g., S, M, and L display sizes) beforehand for the AP. Therefore, when the touchdown of the first icon is detected, the image processing apparatus 101 can refer to a threshold that is variable depending on the display size to determine whether the first icon is in contact with the display frame.

Subsequently, while the user is dragging the first icon, the image processing apparatus 101 determines whether the first icon is in contact with the display frame with reference to the threshold determined according to the display size of the first icon. For example, in a case where the user wants to move an application button to a page that is present on the right side of the display frame, the image processing apparatus 101 determines that the application button is in contact with the display frame 402 if a value "x1+w1−M1" exceeds a value "w2+x2" in which M1 is a threshold for the M size. On the other hand, in a case where the user wants to move an application button to a page that is present on the left side of the display frame, the image processing apparatus 101 determines that the application button is in contact with the display frame 402 if a value "x1+M1" is less than x2. In the present exemplary embodiment, it is assumed that the setting value of the threshold increases as the display size of the icon increases. Therefore, under the control according to the second exemplary embodiment, in the case of the small icon, the page transition occurs even if the overlapping between the icon and the display frame is small. On the other hand, in the case of the large icon, the page transition does not occur if the icon and the display frame are slightly overlapped. Hereinafter, features of the second exemplary embodiment different from those described in the first exemplary embodiment are mainly described.

Figure 6:
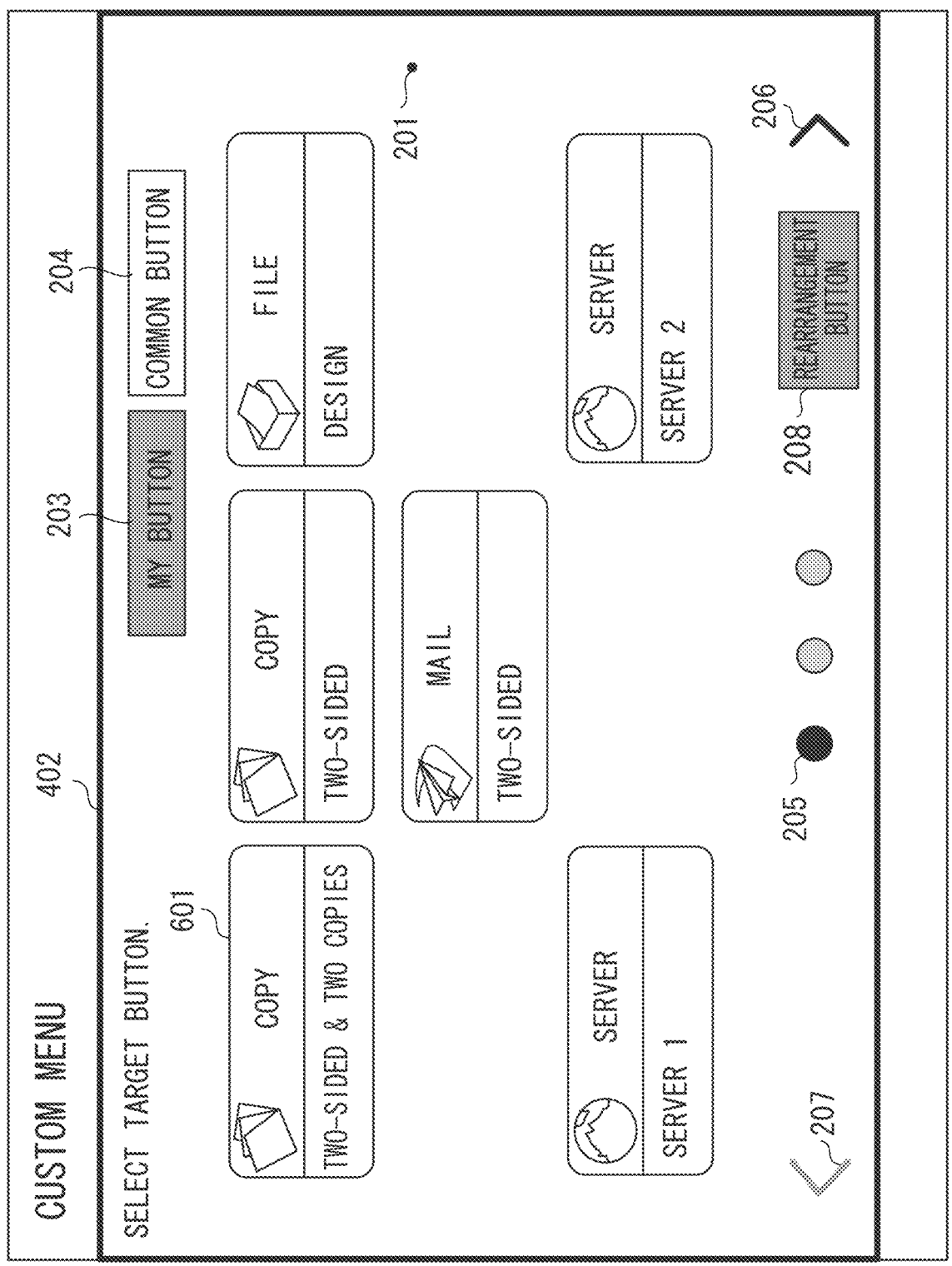
FIG. 6 illustrates an example of the display screen according to a second exemplary embodiment.

FIG. 6 illustrates a display screen according to the second exemplary embodiment. Elements similar to those illustrated in FIG. 2 are denoted by the same reference numerals. Although the display size of the copy button 202 illustrated in FIG. 2A is the M size, the display size of a copy button 601 illustrated in FIG. 6 is the S size.

Figure 7:
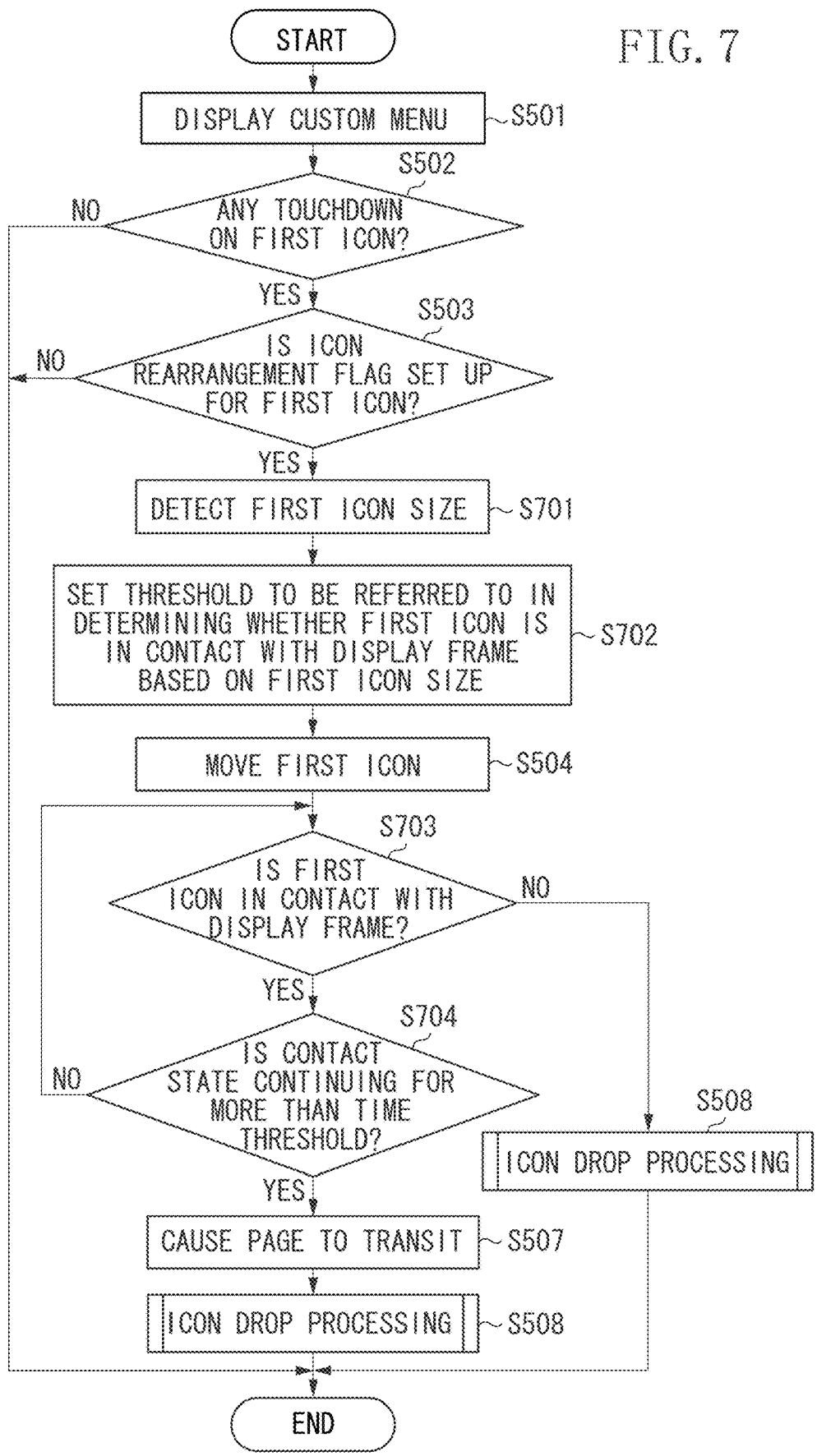
FIG. 7 is a flowchart illustrating a processing procedure according to the second exemplary embodiment.

FIG. 7 is a flowchart illustrating a procedure of processing that can be performed by the image forming apparatus 101 according to the second exemplary embodiment and corresponds to FIGS. 5A and 5B described in the first exemplary embodiment. Processing steps similar to those illustrated in FIGS. 5A and 5B are denoted by the same reference numerals. Hereinafter, features not described with reference to FIGS. 5A and 5B will be mainly described.

Similar to FIGS. 5A and 5B, to realize each processing step of the flowchart illustrated in FIG. 7, the CPU 111 executes the program loaded from the ROM 113 or the external memory 122 of the image forming apparatus 101.

Processing to be performed in steps S501 to S503, which includes displaying the custom menu and determining whether the first icon is selected and the icon rearrangement flag is set up, is similar to that described in the first exemplary embodiment (see FIG. 5A). In the second exemplary embodiment, if the CPU 111 determines that the icon rearrangement flag is set up for the first icon (YES in step S503), then in step S701, the CPU 111 detects (acquires) the display size of the first icon. Then, in step S702, the CPU 111 sets a threshold to be referred to in determining whether the first icon is in contact with the display frame. Subsequently, in step S504, the CPU 111 causes the first icon to move.

In step S703, the CPU 111 determines whether the moving first icon is in contact with the display frame based on the threshold having been set. If the CPU 111 determines that the first icon is in contact with the display frame (YES in step S703), then in step S704, the CPU 111 determines whether the contact state continues for a predetermined time with reference to the threshold. If the CPU 111 determines the continuation time of the contact state is equal to or greater than the threshold (YES in step S704), the operation proceeds to step S507 and the following processing, which has been already described. If the CPU 111 determines that the continuation time of the contact state is less than the threshold (NO in step S704), the operation returns to the above-mentioned step S703.

According to the second exemplary embodiment, if the display size of an icon changes, the threshold to be referred to in determining whether the icon is in contact with the display frame changes correspondingly. Therefore, it becomes feasible to eliminate an error operation that may occur due to a page transition in a case where a user does not perceive the contact between the icon and the display frame. Thus, the user can perform an operation intuitively.

Next, a third exemplary embodiment will be described in detail below. The image processing apparatus 101 according to the third exemplary embodiment has a configuration similar to that described in the first exemplary embodiment. Hereinafter, constituent elements similar to those described in the first exemplary embodiment are denoted by the same reference numerals. In the third exemplary embodiment, in a case where an icon is in contact with the display frame, the image processing apparatus 101 permits a page to transit if the icon is stationary (i.e., the icon is in a stopped state) and the contact state continues for a predetermined time. Hereinafter, features of the third exemplary embodiment different from those described in the first exemplary embodiment are mainly described.

Figure 8:
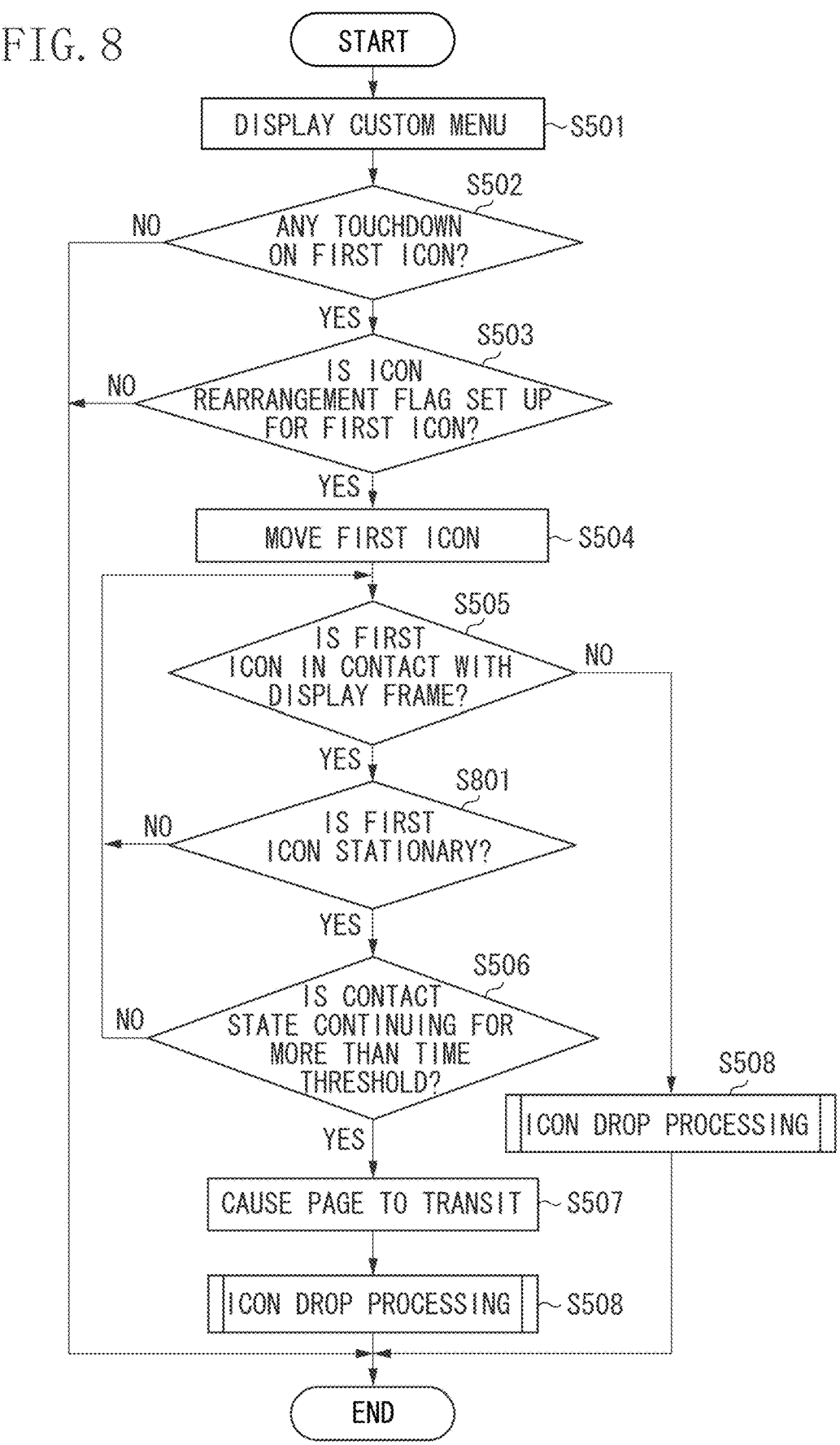
FIG. 8 is a flowchart illustrating a processing procedure according to a third exemplary embodiment.

FIG. 8 is a flowchart illustrating a procedure of processing that can be performed by the image forming apparatus 101 according to the third exemplary embodiment and corresponds to FIGS. 5A and 5B described in the first exemplary embodiment. Processing steps similar to those illustrated in FIGS. 5A and 5B are denoted by the same reference numerals. Hereinafter, features not described with reference to FIGS. 5A and 5B will be mainly described. Similar to FIGS. 5A and 5B, to realize each processing step of the flowchart illustrated in FIG. 8, the CPU 111 executes the program loaded from the ROM 113 or the external memory 122 of the image forming apparatus 101.

Processing to be performed in steps S501 to S505, which includes displaying the custom menu and determining whether the first icon is in contact with the display frame, is similar to that described in the first exemplary embodiment.

In the third exemplary embodiment, if the CPU 111 determines that the first icon is in contact with the display frame (YES in step S505), then in step S801, the CPU 111 determines whether the first icon is stationary. More specifically, if a pixel movement corresponding to a predetermined number of pixels is not detected within a predetermined time to be referred to in determining the stationary state, the CPU 111 determines that the first icon is stationary. If the CPU 111 determines that the first icon is stationary (YES in step S801), the operation proceeds to step S506, which has been already described. If the CPU 111 determines that the first icon is not stationary (NO in step S801), the operation returns to step S505.

As mentioned above, according to the third exemplary embodiment, the page transition is allowed only when the first icon is stationary. More specifically, the page transition does not occur before the user confirms the transition of the icon between pages. Therefore, it is feasible to prevent the page transition from occurring due to an erroneous dragging operation or an unintended operation. The user-friendliness can be enhanced.

Next, a fourth exemplary embodiment will be described in detail below. The image processing apparatus 101 according to the fourth exemplary embodiment has a configuration similar to that described in the first exemplary embodiment. Hereinafter, constituent elements similar to those described in the first exemplary embodiment are denoted by the same reference numerals. In the fourth exemplary embodiment, the image processing apparatus 101 causes a page to transit if a movement of an icon directed toward another page is detected after the contact state of the icon continues for a predetermined time. Hereinafter, features of the fourth exemplary embodiment different from those described in the first exemplary embodiment are mainly described.

FIG. 9 is a flowchart illustrating a procedure of processing that can be performed by the image forming apparatus 101 according to a fourth exemplary embodiment and corresponds to FIGS. 5A and 5B described in the first exemplary embodiment. Processing steps similar to those illustrated in FIGS. 5A and 5B are denoted by the same reference numerals. Hereinafter, features not described with reference to FIGS. 5A and 5B will be mainly described. Similar to FIGS. 5A and 5B, to realize each processing step of the flowchart illustrated in FIG. 9, the CPU 111 executes the control program loaded from the ROM 113 or the external memory 122 of the image forming apparatus 101.

Processing to be performed in steps S501 to S506, which includes displaying the custom menu, determining whether the first icon is in contact with the display frame, and further determining whether the contact time is equal to or greater than the predetermined time, is similar to that described in the first exemplary embodiment.

In the fourth exemplary embodiment, if the CPU 111 determines that the first icon and the display frame are in contact with each other continuously for the predetermined time (YES in step S506), then in step S901, the CPU 111 determines whether a drag movement directed toward another page has been detected. If the CPU 111 determines that the movement has been detected (YES in step S901), the operation proceeds to step S507 processing, which has been already described. If the CPU 111 determines that the movement has not been detect (NO in step S901), the operation returns to step S506.

According to the fourth exemplary embodiment, a user's drag moving operation is always necessary to cause a page to transit. Therefore, the user can move the page in an intended direction. The user-friendliness can be enhanced.

Other Exemplary Embodiment

Although the present invention has been described with reference to some exemplary embodiments, the present invention is not limited to only the above-mentioned exemplary embodiments and can be modified in various ways without departing from the scope of the present invention. Further, the above-mentioned exemplary embodiments can be appropriately combined with each other at least partly.

Further, the content that can be scroll displayed and drag & drop operable on the display device 121 is not limited to the information about the application button included in the custom menu screen. The present invention is also applicable to the display of any other data that can be scroll displayed and drag & drop operable.

Further, the present invention is also applicable to any content other than the application button if processing associated with a display item can be performed when the display item is pressed. Further, the present invention is not limited to the content that is scrolled in the right and left direction. The present invention is also applicable to a content that is scrolled in the up and down direction or in an inclined direction and a content that is scrolled in any other direction.

Although the above-mentioned exemplary embodiments have been described with reference to the image forming apparatus 101 that has multiple functions (including the copy and scanner functions), the present invention is also applicable to an image processing apparatus that includes a part of the above-mentioned functions. Further, the present invention is applicable to a personal computer, a personal digital assistant (PDA), a portable phone, a facsimile machine, a camera, a video camera, an image viewer, and another image forming apparatus.

According to the present invention, when a user moves a content, switching of pages is performed at the time when an end portion of the content is brought into contact with the display frame, irrespective of the position of the input instruction member. Therefore, the user can intuitively move the content to another page. In this respect, the image forming apparatus according to the present invention is excellent in user-friendliness when the user shifts the content between pages.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-252891, filed Dec. 15, 2014, and No. 2015-208609, filed Oct. 23, 2015, which are hereby incorporated by reference herein in their entirety.

What is claimed is:

1. A display apparatus having a plurality of functions at least including a print function, comprising:
   a touch panel display that displays a first page that includes a region surrounded by a display frame in which icons corresponding respectively to a plurality of functions are disposed, and receives a drag operation for dragging a first icon among a plurality of icons arranged on the first page from the first page to a second page using an input instruction member;
   wherein a processor causes, in a case where a part of the first icon being dragged is moved beyond the display frame and where the part of the first icon that is beyond the display frame as a result of the drag movement becomes not displayed and where it is determined that a position of the first icon meets a predetermined condition for a predetermined time or longer, the first icon to move from the first page to the second page such that a plurality of icons arranged on the first page except for the first icon is kept arranged on the first page and wherein a threshold for determining that the part of the first icon being dragged is moved beyond the display frame is changed depending on size of the first icon being dragged.

2. The display apparatus according to claim 1, wherein the processor switches the first page to the second page when the first icon has been moved to a position where an edge of the first icon is beyond the display frame.

3. The display apparatus according to claim 2, wherein the processor further sets a threshold based on a display size of the first icon for determining whether the edge of the first icon is beyond the display frame,
   the processor further determines whether the edge of the first icon is beyond the display frame based on the threshold having been set, and
   wherein the processor switches the first page to the second page based on a determination result obtained by the processor.

4. The display apparatus according to claim 2, wherein the processor switches the first page to the second page in a case where the first icon is stationary in the state in which the edge of the first icon is beyond the display frame, and the stationary state continues for a predetermined time.

5. The display apparatus according to claim 4, wherein the processor determines that the first icon is stationary in a case where a moving distance of the first icon does not reach a predetermined distance for the predetermined time.

6. The display apparatus according to claim 2, wherein in a case where the state in which the edge of the first icon is beyond the display frame continues for a predetermined time and then a movement of the first icon has been detected, the processor switches the displayed first page to the second page that is present in the detected moving direction.

7. The display apparatus according to claim 1, wherein the processor switches the first page to the second page while maintaining a display state of the first icon being dragged.

8. The display apparatus according to claim 1, further comprising:
 a user interface that sets whether to validate a movement of the icon,
 wherein the touch panel display accepts the moving operation with the input instruction member if the movement of the icon is validated by the user interface.

9. The display apparatus according to claim 1, wherein, when the first icon is moved to the second page by the drag operation, the processor causes the touch panel display to perform display such that a color is put on a blank area where the first icon is able to be dragged on the second page and where no other icon is placed.

10. The display apparatus according to claim 9, wherein, when the first icon is moved to the second page by the drag operation, the processor causes the touch panel display to perform display such that a color is put on, among a plurality of blank areas where the first icon is able to be dragged on the second page, a blank area where at least a part of the first icon that is currently being dragged overlaps.

11. The display apparatus according to claim 1, wherein the predetermined condition is whether a state that an end edge of the first icon coincides with or exceeds an end edge of the display frame continues for a predetermined time or longer, and the processor causes the first icon to move to the second page that is present to the right of the first page if determined that a state that a right end edge of the first icon coincides with or exceeds a right end edge of the display frame continues for a predetermined time or longer, and
 the processor causes the first icon to move to a third page that is present to the left of the first page if determined that a state that a left end edge of the first icon coincides with or exceeds a left end edge of the display frame continues for a predetermined time or longer.

12. The display apparatus according to claim 1, wherein the part of the first icon being dragged is determined to have been moved beyond the display frame when a coordinate of an edge of the first icon being dragged has been moved beyond the display frame.

13. The display apparatus according to claim 1, wherein the first icon being dragged has a longer side in a predetermined axis direction.

14. The display apparatus according to claim 1, wherein the first icon being dragged has a longer side in a predetermined axis direction, and, in a case where an edge of the first icon in a direction perpendicular to the predetermined axis direction is dragged beyond an edge of the display frame in the direction perpendicular to the predetermined axis direction, the first icon is moved from the first page to the second page.

15. The display apparatus according to claim 1, wherein size of the icons corresponding respectively to the plurality of functions is changeable.

16. A method for controlling a display apparatus having a plurality of functions at least including a print function, and that includes a touch panel display that displays a first page that includes a region surrounded by a display frame in which icons corresponding respectively to the plurality of functions are disposed, and receives a drag operation for dragging a first icon among a plurality of icons arranged on the first page from the first page to a second page using an input instruction member, the method comprising:
 in a case where a part of the first icon being dragged is moved beyond the display frame and where the part of the first icon that is beyond the display frame as a result of the drag movement becomes not displayed and where it is determined that a position of the first icon meets a predetermined condition for a predetermined time or longer, causing the first icon to move from the first page to the second page such that a plurality of icons arranged on the first page except for the first icon is kept arranged on the first page, wherein a threshold for determining that the part of the first icon being dragged is moved beyond the display frame is changed depending on size of the first icon being dragged.

17. The method according to claim 16, wherein the first page is switched to the second page when the first icon has been moved to a position where an edge of the first icon is beyond the display frame.

18. The method according to claim 17, wherein a threshold is set based on a display size of the first icon for determining whether the edge of the first icon is beyond the display frame,
 it is determined whether the edge of the first icon is beyond the display frame based on the threshold having been set, and
 wherein the first page is switched to the second page based on a determination result of the determining.

19. The method according to claim 17, wherein the first page is switched to the second page in a case where the first icon is stationary in the state in which the edge of the first icon is beyond the display frame, and the stationary state continues for a predetermined time.

20. The method according to claim 19, wherein it is determined that the first icon is stationary in a case where a moving distance of the first icon does not reach a predetermined distance for the predetermined time.

21. The method according to claim 17, wherein in a case where the state in which the edge of the first icon is beyond the display frame continues for a predetermined time and then a movement of the first icon has been detected, the displayed first page is switched to the second page that is present in the detected moving direction.

22. The method according to claim 16, wherein the first page is switched to the second page while maintaining a display state of the first icon being dragged.

23. The method according to claim 16, further comprising:
 setting, via a user interface, whether to validate a movement of the icon,
 wherein the touch panel display accepts the moving operation with the input instruction member if the movement of the icon is validated by the user interface.

24. A storage medium storing a program that causes a computer to perform a method for controlling a display apparatus having a plurality of functions at least including a print function, and that includes a touch panel display that displays a first page that includes a region surrounded by a display frame in which icons corresponding respectively to the plurality of functions are disposed, and receives a drag operation for dragging a first icon among a plurality of icons arranged on the first page from the first page to a second page using an input instruction member, the method comprising:

in a case where a part of the first icon being dragged is moved beyond the display frame and where the part of the first icon that is beyond the display frame as a result of the drag movement becomes not displayed and where it is determined that a position of the first icon meets a predetermined condition for a predetermined time or longer, causing the first icon to move from the first page to the second page such that a plurality of icons arranged on the first page except for the first icon is kept arranged on the first page, wherein a threshold for determining that the part of the first icon being dragged is moved beyond the display frame is changed depending on size of the first icon being dragged.

25. The storage medium according to claim 24, wherein the first page is switched to the second page when the first icon has been moved to a position where an edge of the first icon is beyond the display frame.

26. The storage medium according to claim 25, wherein a threshold is set based on a display size of the first icon for determining whether the edge of the first icon is beyond the display frame, it is determined whether the edge of the first icon is beyond the display frame based on the threshold having been set, and wherein the first page is switched to the second page based on a determination result of the determining.

27. The storage medium according to claim 25, wherein the first page is switched to the second page in a case where the first icon is stationary in the state in which the edge of the first icon is beyond the display frame, and the stationary state continues for a predetermined time.

28. The storage medium according to claim 27, wherein it is determined that the first icon is stationary in a case where a moving distance of the first icon does not reach a predetermined distance for the predetermined time.

29. The storage medium according to claim 25, wherein in a case where the state in which the edge of the first icon is beyond the display frame continues for a predetermined time and then a movement of the first icon has been detected, the displayed first page is switched to the second page that is present in the detected moving direction.

30. The storage medium according to claim 24, wherein the first page is switched to the second page while maintaining a display state of the first icon being dragged.

31. The storage medium according to claim 24, the method further comprising:

setting, via a user interface, whether to validate a movement of the icon, wherein the touch panel display accepts the moving operation with the input instruction member if the movement of the icon is validated by the user interface.

* * * * *